April 5, 1932. A. HOLMQUIST 1,852,523
TOMATO CORER
Filed Jan. 14, 1928 3 Sheets-Sheet 2

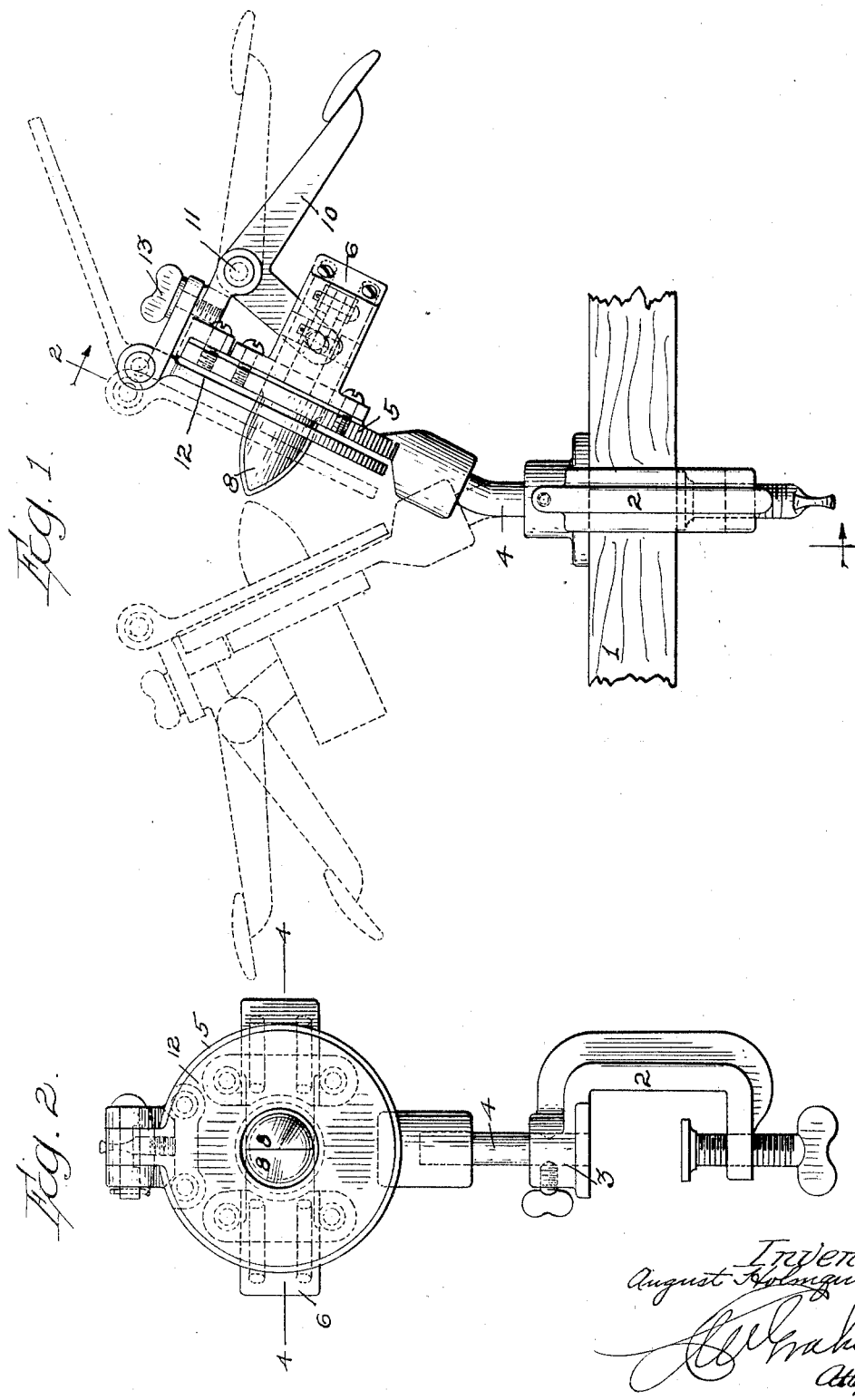

Inventor
August Holmquist

April 5, 1932.　　　A. HOLMQUIST　　　1,852,523

TOMATO CORER

Filed Jan. 14, 1928　　3 Sheets-Sheet 3

Inventor
August Holmquist
Graham
Atty.

Patented Apr. 5, 1932

1,852,523

UNITED STATES PATENT OFFICE

AUGUST HOLMQUIST, OF HOOPESTON, ILLINOIS, ASSIGNOR TO SPRAGUE SELLS CORPORATION, OF HOOPESTON, ILLINOIS

TOMATO CORER

Application filed January 14, 1928. Serial No. 246,757.

This invention is related particularly to a machine for removing the stem ends and cores from tomatoes, but is of course applicable to the treatment of other fruits and vegetables requiring treatment of a like or similar nature.

It is well known that tomatoes grow and ripen in various sizes and shapes and on this account it has heretofore been very difficult to core them properly, either by hand or machines, and remove only the core and stem end portions and not disturb the seed cells and pulp. Tomatoes also have a tendency to crack around the stem end during growth and these cracks gather dirt and mold spores and as growth continues these cracks grow over and enclose the adhering dirt and mold spores and are not removable by washing or any other treatment except actual removal of this stem end of the tomato and the core adjacent thereto.

In removing the stem end and the core it is of the utmost importance that the seed cell structure be not disturbed or broken, if it is cut into the tomato will bleed and collapse during the processing and cooking operations preparatory to canning the product. If the seed cell structure remains unbroken in the preliminary operation of coring the juices and pulp remain intact and do not run from the cored end during the peeling and cooking operations with the result that the tomatoes stand up whole and unbroken and make a much finer and better priced product than would otherwise be produced.

In hand coring the operators are more or less careless in inserting the coring knives and invariably rupture some parts of the seed cells surrounding the core portion, these tomatoes almost always collapse and pass into a pulpy condition during the subsequent operations. Previous to my invention machine corers were subject to the same fault owing almost entirely to the manner of inserting the coring implements into and around the core portion to be removed. In all machines known to me the coring knives have been placed substantially parallel, while the core portion to be removed is more or less conical in shape with the seed cells lying quite closely surrounding the conical core portion. It is therefore easily seen that knives, propelled either by hand or machine, that move in more or less parallel relation will almost surely puncture some portions of the seed cell structure, and no matter how small this puncture to the seed cell structure is it will almost invariably cause bleeding and a final collapse of the tomato before the final operations preparatory to placing in the can are reached.

My invention contemplates providing coring knives mounted to move through converging angular paths and having the function of removing the core as, or in the shape of a frusto cone. The cutting action is confined to the space between the core portion and the seed cell structure, which is more or less uniform in all tomatoes regardless of their size or shape, except in extreme differences in size when an adjustment may be necessary in the coring apparatus to accommodate these differences.

It is therefore a principal object of my invention to provide a means for coring tomatoes, or performing similar operation on other fruits and vegetables, wherein the core portion is removed in the shape of a frusto cone to thereby avoid mutilation or puncturing of the adjacent seed cells of the fruit or vegetable.

It is a further object of my invention to provide apparatus for the specified purpose wherein the coring implements are moved to sever the core portion from adjoining parts without entering the seed cell structure.

It is also an object of the invention to provide a coring apparatus that will be easily adjustable to accommodate products of greatly varying sizes and growth conditions.

It is further an object of my invention to provide a coring apparatus that will be easily adjustable for either right or left hand operation.

It is also an object of the invention to provide a coring apparatus that is very simple in operation and construction which will not require skilled operators to manipulate.

With such objects in view as well as other advantages which may be inherent in the invention, consisting in the parts and combinations hereinafter set forth and claimed, it is understood that the several necessary elements, parts and combinations constituting the same may be varied in their proportion, placement and general arrangement without departing from the scope and nature of the invention.

In order to make the invention more clearly understood there are shown, somewhat diagrammatically, the preferred means and mechanism for placing the same in concrete form, without limiting the improvements in their application to the particular construction chosen to illustrate the invention.

Referring now to the drawings accompanying this application a better and clearer understanding of the invention will be had, in which:

Fig. 1 represents what may be termed a side elevation of the apparatus chosen to illustrate the invention. This view clearly shows how the apparatus may be adjusted for either right or left hand operation and also shows by dotted lines certain adjustments desirable for handling greatly varying sizes of products.

Fig. 2 represents an end elevation of the full line showing of Fig. 1 looking in the direction of the arrow 2.

Figure 3:
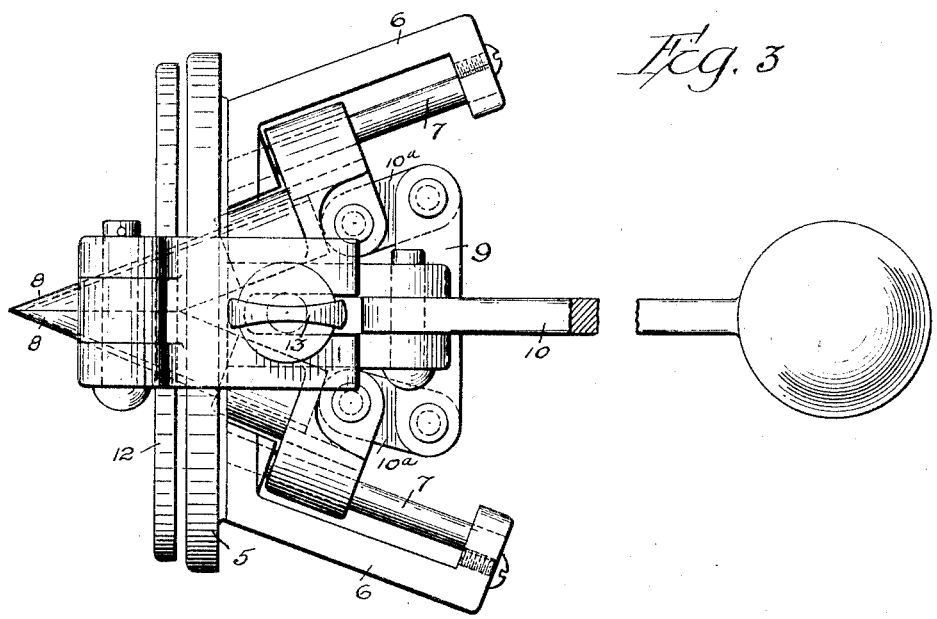
Fig. 3 is a plan of Fig. 2 but with the parts in the direction of Fig. 1.
Figure 6:
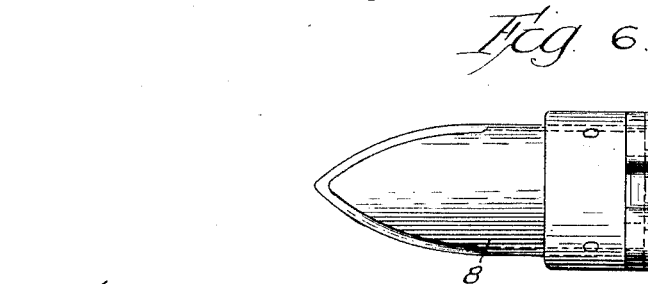
Fig. 6 is a plan view of one of the coring knives.
Figure 8:
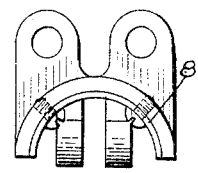
Fig. 8 is an end elevation of a coring knife.
Figure 7:
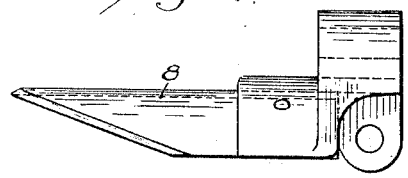
Fig. 7 is a side elevation of one of the coring knives.
Figure 4:
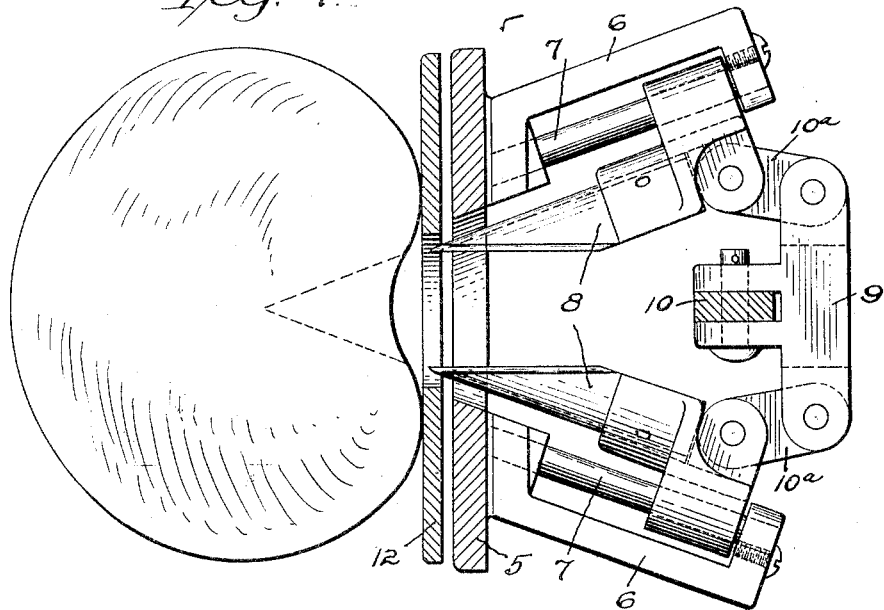
Fig. 4 is a sectional view taken on approximately the line 4—4 of Fig. 2 but with the coring knives, the link mechanism and the bearings for guiding the knives in full line showing. This view shows a tomato just positioned in front of the opening in the guard shield preparatory to performing the coring operation.

1 represents a table or other support on which the apparatus may be mounted by means of the clamp 2. The top of the clamp 2 has a boss 3 and set screw by means of which the standard 4 is secured. The standard 4 is bent slightly as is indicated in Fig. 1 bringing the operating face of the apparatus in better visual line with the operator. On this standard 4 is mounted the face plate 5, which in turn carries the brackets 6, which in turn carry the slide way bars 7 forming in turn bearings for the knives 8, which it will be noted are positioned to permit the knives to move angularly toward each other as they enter the tomato to cut therefrom the core portion. 9 is a link block carrying on each end the links 10ª which in turn connect with the knives 8 as is clearly shown in Figs. 4 and 5. 10 is an operating lever connecting with the link block 9 and by means of which the knives are moved in unison to enter the core portion of the tomato, the movement of which is limited by the length of the slide way bars 7 and which is sufficient to permit complete withdrawal of the knives from the fruit as in Fig. 4 and to enter the fruit the desired distance as in Fig. 5. The operating lever 10 is pivoted at 11 to a fixed projection from the plate 5. An auxiliary plate 12 is provided which may be termed a guard plate and is secured in adjustable position by means of the thumb screw 13, permitting adjustment relative to the fixed plate 5. Plate 12 has the function of limiting the depth of penetration of the coring knives 8 into the fruit as is noted by the dotted adjustment in Fig. 1. This guard plate 12 is pivoted as shown to lift up out of the way for inspection of the knives.

Operation

Figure 5:
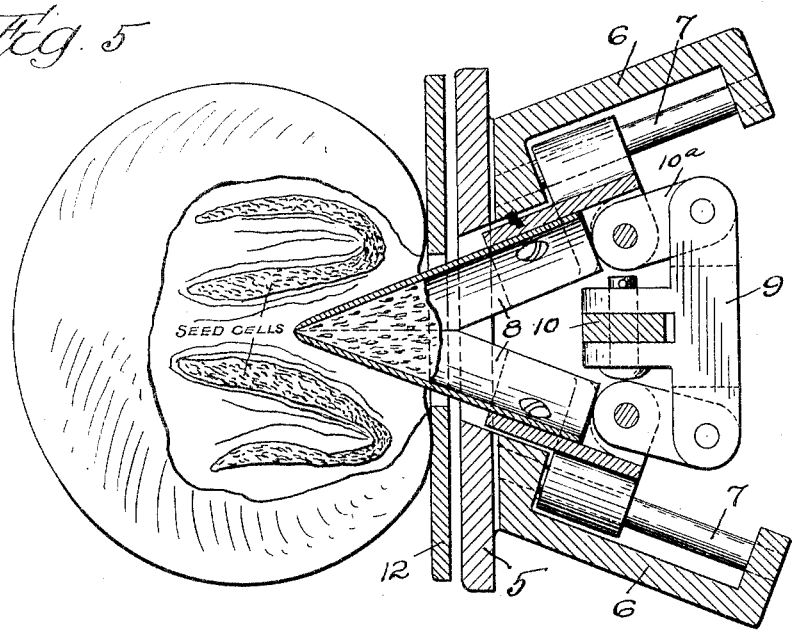
Fig. 5 is a view similar to Fig. 4 with the exception that the knives are here also shown in section and as encompassing the conical shaped core just cut from the tomato, the knives in this view having been moved to the extreme position of the coring operation.

The operation of the machine is simple in the extreme. The operator takes a tomato or other product to be treated and places it against the guard plate 12 as in Fig. 4 holding it in position with one hand. Then with the other hand the lever 10 is depressed which causes the coring knives to move forward into the tomato cutting out a conical portion as is clearly shown in Fig. 5. The handle 10 is then retracted to the dotted position of Fig. 1 which withdraws the coring knives and the severed core, which latter drops away as it is fully released by the knives and the coring operation is completed. By reference to Fig. 5 it will be seen how the converging knives enter the fruit and cut into the zone of material between the core and the seed cell structure thereby entirely missing the seed cell structure. This zone is of sufficient extent when the cut is made conical, to permit of some latitude in placing the fruit against the guard plate in that if it is not exactly central therewith the cut will still be made without entering the seed cells. This conical cut is the essence of my invention and Fig. 5 illustrates very vividly its paramount advantages over all other methods of operation.

What I claim as new and desire to secure by Letters Patent is:

1. An apparatus for removing the cores from tomatoes and like fruits comprising a coring mechanism having coring elements adapted to sever a core from a tomato, slide ways for supporting said coring elements positioned to give converging movement to said coring elements and means for moving said elements into and out of engagement with a tomato to remove the core therefrom.

2. An apparatus for coring fruits and vegetables comprising a pair of coring knives, slide ways for supporting said knives arranged in converging relation, means for moving the knives along said slideways, and means against which a fruit or vegetable may be positioned in operative relation to said knives whereby when said knives are moved the core will be severed from said fruit or vegetable.

3. An apparatus for coring fruits or vegetables comprising a pair of knives arranged in opposed relation, slideways on which said knives are mounted, means for moving the said knives along said slideways whereby the movement of said knives will sever a frusto conical portion from said fruit or vegetable.

4. An apparatus for coring fruits or vegetables comprising mechanism for severing a frusto conical portion from a positioned fruit or vegetable, fixed slide means arranged in converging relation for supporting and guiding said severing mechanism means for moving said severing mechanism along said fixed slide means to remove a conical portion from said fruit or vegetable and means for holding said fruit or vegetable during the coring operation.

5. A machine for removing the core portion from tomatoes without disturbing or rupturing the seed cells comprising a fixed support, converging slide ways on said support, coring knives supported by and adapted to move along said slide ways, means for moving said knives therealong, means for aligning a tomato in operative relation with said coring knives whereby as said knives are moved along said slide ways they will cut from the positioned tomato a frusto conical core portion and not enter or puncture the seed cells of said tomato.

6. A machine for removing the core portion from tomatoes without cutting into the seed cell structure comprising a fixed support, converging slide ways on said support, coring knives supported by and adapted to move along said slide ways, means for moving said knives therealong, adjustable means for positioning a tomato in operative relation with said coring knives whereby as said knives move along said slide ways they will operate to sever a frusto conical portion from the positioned tomato and not rupture the seed cells of said tomato.

7. A machine for coring tomatoes comprising a pair of coring knives, converging slide ways on which said knives move, manual means for moving said knives, adjustable means against which a tomato may be positioned while said knives remove a conical portion therefrom.

8. A machine for coring tomatoes comprising a standard, means permitting positioning said standard for right or left hand operation, a fixed member on said standard, converging ways on said standard, coring knives mounted to move along said converging ways, a link mechanism connecting said knives for simultaneous movement, means for operating said link mechanism, means against which a tomato is held in operative relation with said knives, means for moving said knives to pierce said tomato and remove a conical portion therefrom without puncturing the seed cells of said positioned tomato.

9. A manually operated machine for coring tomatoes comprising a pair of coring knives moving along diverging paths, slide ways carrying said knives and providing the said converging paths, a manually operated lever member engaging said knives through a link motion mechanism and moving them along said converging pathways, a fixed member through which said knives project and a guide member against which a tomato may be positioned with the core portion in operative relation with said knives and adapted to be pierced by said knives and have a conical core portion removed when said knives are retracted, said operation to be performed without piercing the seed cell structure of the positioned tomato.

10. A machine for coring tomatoes comprising a pair of coring knives arranged with their axes convergent, guideways for said knives to confine them to straight line movement, and means for axially reciprocating said knives.

11. A machine for coring tomatoes comprising a pair of coring knives arranged in angular relation with their axes convergent, means for axially reciprocating said knives, and guide means for maintaining the knives in fixed angular relation.

In testimony whereof I affix my signature.

AUGUST HOLMQUIST.